(12) United States Patent
Vernaza et al.

(10) Patent No.: US 11,049,265 B2
(45) Date of Patent: Jun. 29, 2021

(54) BALANCING DIVERSITY AND PRECISION OF GENERATIVE MODELS WITH COMPLEMENTARY DENSITY ESTIMATORS

(71) Applicant: NEC Laboratories America, Inc., Princeton, NJ (US)

(72) Inventors: Paul Vernaza, Sunnyvale, CA (US); Nicholas Rhinehart, Pittsburgh, PA (US); Anqi Liu, Pasadena, CA (US); Kihyuk Sohn, Fremont, CA (US)

(73) Assignee: NEC Corporation

( * ) Notice: Subject to any disclaimer, the term of this patent is extended or adjusted under 35 U.S.C. 154(b) by 145 days.

(21) Appl. No.: 16/406,242

(22) Filed: May 8, 2019

(65) Prior Publication Data
US 2019/0355134 A1  Nov. 21, 2019

Related U.S. Application Data

(60) Provisional application No. 62/672,571, filed on May 16, 2018, provisional application No. 62/796,658, filed on Jan. 25, 2019.

(51) Int. Cl.
*G06T 7/246* (2017.01)
*G06N 7/00* (2006.01)
*G06K 9/00* (2006.01)
*G06N 3/08* (2006.01)

(52) U.S. Cl.
CPC .......... *G06T 7/251* (2017.01); *G06K 9/00201* (2013.01); *G06K 9/00805* (2013.01); *G06N 3/08* (2013.01); *G06N 7/005* (2013.01)

(58) Field of Classification Search
CPC .......... G06T 7/251; G06N 7/005; G06N 3/08; G06N 3/0472; G06N 3/084; G06N 3/0454; G06K 9/00201; G06K 9/00805; G06K 9/6256
See application file for complete search history.

(56) References Cited

U.S. PATENT DOCUMENTS 9,568,915 B1 * 2/2017 Berntorp ............. B60W 30/095
10,733,876 B2 * 8/2020 Moura ............... G06K 9/00785
(Continued)

OTHER PUBLICATIONS

Kingma, "Auto-encoding Variational Bayes", arXiv:1312.6114, Dec. 2013, 14 pages.
(Continued)

*Primary Examiner* — Ming Y Hon
(74) *Attorney, Agent, or Firm* — Joseph Kolodka

(57) ABSTRACT

Systems and methods for training and evaluating a deep generative model with an architecture consisting of two complementary density estimators are provided. The method includes receiving a probabilistic model of vehicle motion, and training, by a processing device, a first density estimator and a second density estimator jointly based on the probabilistic model of vehicle motion. The first density estimator determines a distribution of outcomes and the second density estimator estimates sample quality. The method also includes identifying by the second density estimator spurious modes in the probabilistic model of vehicle motion. The probabilistic model of vehicle motion is adjusted to eliminate the spurious modes.

19 Claims, 7 Drawing Sheets

(56) References Cited

U.S. PATENT DOCUMENTS

| | | | |
|---|---|---|---|
| 2010/0057361 A1* | 3/2010 | Caveney | G08G 1/161 |
| | | | 701/301 |
| 2015/0210280 A1* | 7/2015 | Agnew | B60W 30/095 |
| | | | 701/48 |
| 2017/0174261 A1* | 6/2017 | Micks | B62D 15/0265 |
| 2017/0213067 A1* | 7/2017 | Padmanabhan | G06K 9/0014 |
| 2019/0165432 A1* | 5/2019 | Park | G06N 3/08 |
| 2019/0303669 A1* | 10/2019 | Spooner | G06K 9/3241 |
| 2020/0033855 A1* | 1/2020 | Jammalamadaka | G06N 20/00 |

OTHER PUBLICATIONS

Goodfellow, "Generative Adversarial Nets", Advances in Neural Information Processing Systems, Jun. 2014, 9 pages.

Nowozin, "F-Gan: Training Generative Neural Samplers Using Variational Divergence Minimization", Advances in Neural Information Processing Systems, Jun. 2016, 9 pages.

Arjovsky, "Wasserstein Gan", arXiv:1701.07875, Dec. 2017, 32 pages.

* cited by examiner

BALANCING DIVERSITY AND PRECISION OF GENERATIVE MODELS WITH COMPLEMENTARY DENSITY ESTIMATORS

RELATED APPLICATION INFORMATION

This application claims priority to U.S. Provisional Patent Application No. 62/672,571, filed on May 16, 2018, and to U.S. Provisional Patent Application No. 62/796,658, filed on Jan. 25, 2019, both incorporated herein by reference herein in their entireties.

BACKGROUND

Technical Field

The present invention relates to generative models of high-dimensional, continuous data and more particularly learning generative models of high-dimensional, continuous data.

Description of the Related Art

Methods for modeling continuous, high-dimensional data such as those implemented by Generative Adversarial Networks (GAN) and variational autoencoders suffer from problems including a lack of diversity in the generated samples, unrealistic samples, and very difficult training. The ability of GAN models to generalize is questionable. For example, a common (and commonly executed) failure mode of deep generative models in the GAN family is to model only a small subset of the data. Likewise, although variational autoencoders are known to generalize with a higher scope, for example including modeling more of the data, variational autoencoders generalize at the expense of generating less-precise samples.

SUMMARY

According to an aspect of the present invention, a method is provided for training and evaluating a deep generative model with an architecture consisting of two complementary density estimators are provided. The method includes receiving a probabilistic model of vehicle motion, and training, by a processing device, a first density estimator and a second density estimator jointly based on the probabilistic model of vehicle motion. The first density estimator determines a distribution of outcomes and the second density estimator estimates sample quality. The method also includes identifying by the second density estimator spurious modes in the probabilistic model of vehicle motion. The probabilistic model of vehicle motion is adjusted to eliminate the spurious modes.

According to another aspect of the present invention, a system is provided for training and evaluating a deep generative model with an architecture consisting of two complementary density estimators. The system includes a processor device operatively coupled to a memory device. The processor device receives a probabilistic model of vehicle motion and trains a first density estimator and a second density estimator jointly based on the probabilistic model of vehicle motion. The first density estimator determines a distribution of outcomes and the second density estimator estimates sample quality. Spurious modes are identified by the second density estimator spurious modes in the probabilistic model of vehicle motion. The processor device adjusts the probabilistic model of vehicle motion to eliminate the spurious modes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present invention, systems and methods are provided for warning a driver of a potential collision scenario with sufficient notice to allow the driver to make a corrective action. Other approaches to this problem suffer from either of two failure modes: the system may underestimate the probability of collision or overestimate the probability of collision. The example embodiments mitigate both failure modes by learning a probabilistic model of vehicle motion that assigns high probability to most of the plausible paths in the scene while ensuring that every prediction generated by the model is also likely under the true distribution of future paths. The system then generates samples from this model to estimate the probability that the future path of the vehicle will collide with an obstacle.

The example embodiments can train a model of continuous, high-dimensional, structured data such as images or paths of intelligent agents and perform inferences using the trained model including synthesizing novel examples, assessing the quality of the model, and assessing the quality of samples generated from the model. This model is trained to balance dual objectives of generating diverse samples while ensuring the samples are also of high quality (e.g., likely under the true data distribution). The example embodiments thereby minimize the potential for overestimation or underestimation of collision probabilities.

Embodiments described herein include a deep generative model that optimizes a symmetrized Kullback-Leibler (KL) divergence via a combination of direct density estimation and variational inference. Density estimation is the construction of an estimate, based on observed data, of an unobservable underlying probability density function. The unobservable density function is thought of as the density according to which a large population is distributed; the data are usually thought of as a random sample from that population. The example embodiments ensure samples from data are likely under the model and ensure samples from the model are likely under the data distribution. The example embodiments apply density estimations to ensure samples from the data are likely under the model.

The example embodiments can be applied when the data density is unknown. The example embodiments overcome a lack of information regarding the data density by applying a variational inference technique based on Fenchel duality. The variational parameters consist of a Gibbs distribution, learned jointly with q, that estimates the data density over the support of the model.

The example embodiments, in contrast to approaches that circuitously learn a discriminator from the model and data, and then train the model based on the discriminator, exploit direct density estimation to obtain quantitatively superior coverage of the data and better-quality samples as well as stable training.

Figure 1:
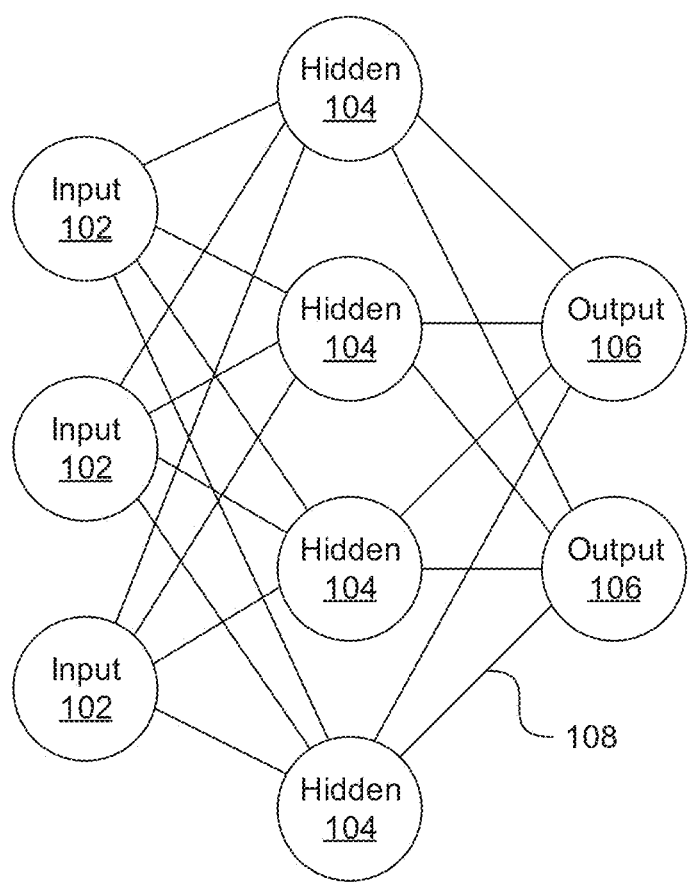
FIG. 1 is a generalized diagram of a neural network, in accordance with an embodiment of the present invention.

Referring now to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
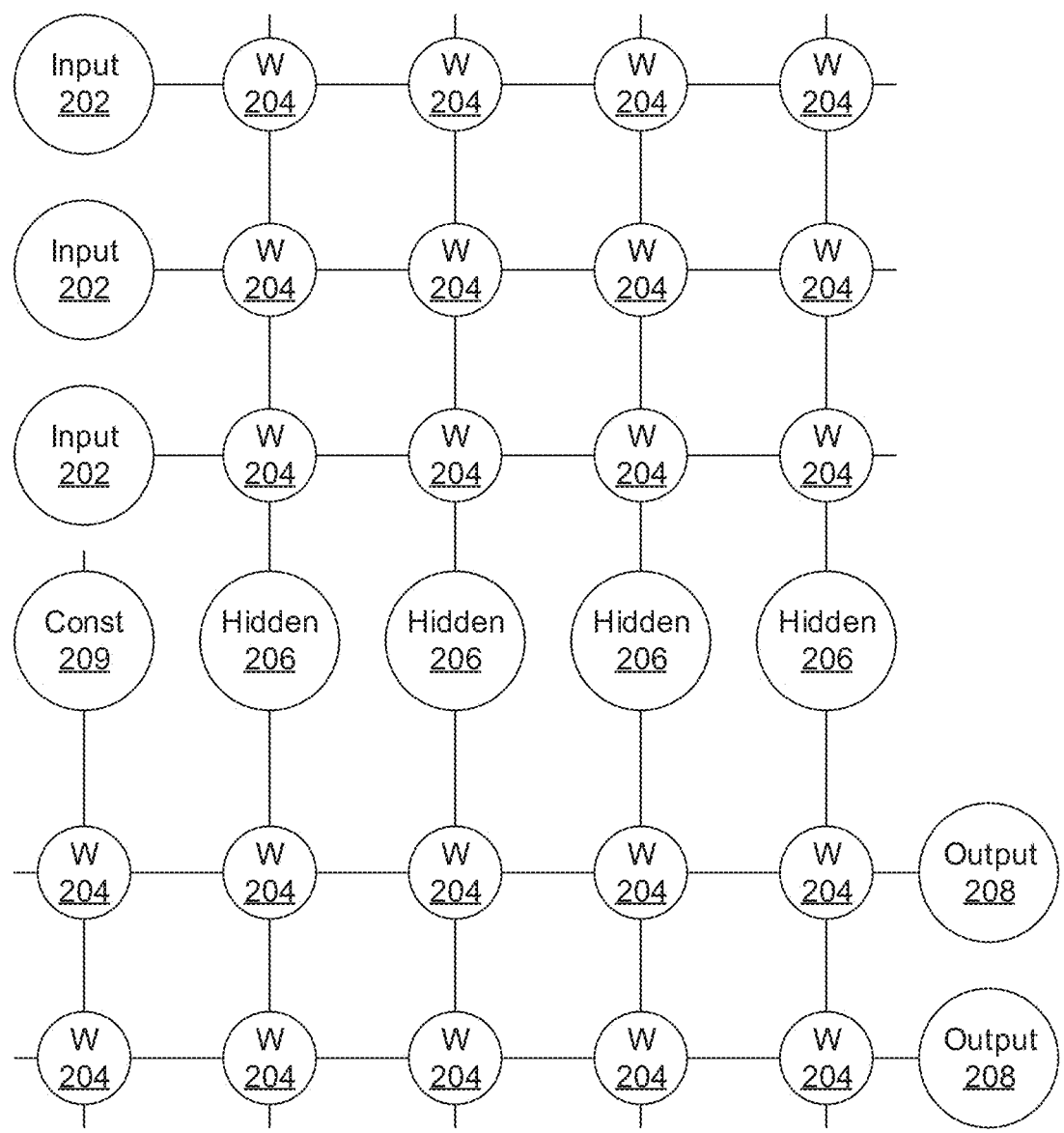
FIG. 2 is a diagram of an artificial neural network (ANN) architecture, in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

Figure 3:
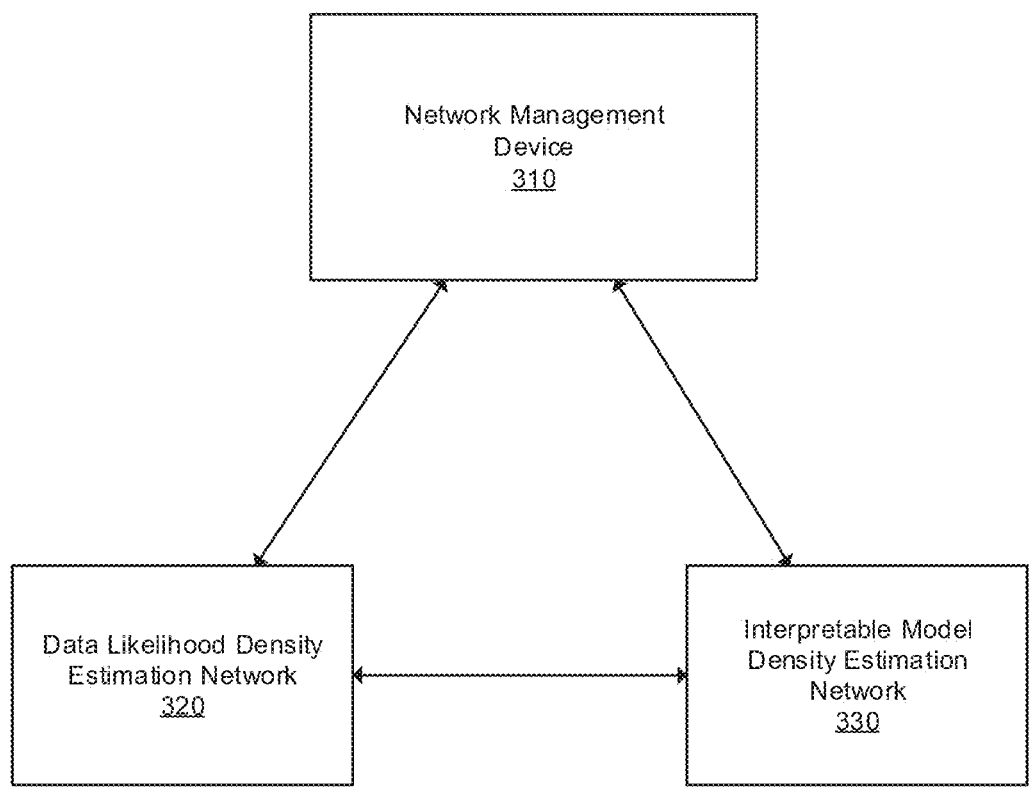
FIG. 3 is a block diagram illustrating a network architecture for balancing diversity and precision of generative models with complementary density estimators, in accordance with the present invention.

Referring now to FIG. 3, a network architecture 300 for balancing diversity and precision of generative models with complementary density estimators is illustratively depicted in accordance with an embodiment of the present invention.

As shown in FIG. 3, network architecture 300 includes two density estimation networks (data likelihood density estimation network 320, which is herein designated q or first density estimator, and interpretable model density estimation network 330, herein designated v or second density estimator) and (in some embodiments, optionally) a network management device 310 that can provide an interface for (a user to manage) data (for example, data input and output) and manages interaction (and data flow) between the two density estimation networks (320 and 330). The first density estimator 320 can be sampled efficiently and enables efficient evaluation while the second density estimator 330 incorporates domain knowledge, evaluates sample quality, and is interpretable. The data likelihood density estimation network 320 and interpretable model density estimation network 330 can include neural networks. The density estimators are trained jointly leveraging variational interference.

The data likelihood density estimation network 320 produces a first model (for example, model q) that can be sampled efficiently. The first model can be used to produce data likelihood estimates.

The interpretable model density estimation network 330 determines an interpretable (e.g., a second) model (which is) jointly trained with the first model (determined by the data likelihood density estimation network 320) that provides an estimate of sample quality. The interpretable model density estimation network 330 trains the interpretable model by optimizing a variational lower bound based on Fenchel duality.

The interpretable model density estimation network 330 trains the network to obtain improved training efficiency, stability, and a balance of diversity and precision in generated examples, while also producing an interpretable model (for example, model v). The interpretable model density estimation network 330 improves training stability by regularizing the second model more effectively using domain knowledge, and by determining the optimal value of the second model independent of the first model.

Network architecture 300 is configured for learning generative models of high-dimensional, continuous data. Network architecture 300 generalizes more of the data while generating more precise samples as compared to other approaches, such as variational autoencoders. In example embodiments, network architecture 300 can be applied to vehicle motion forecasting.

Figure 4:
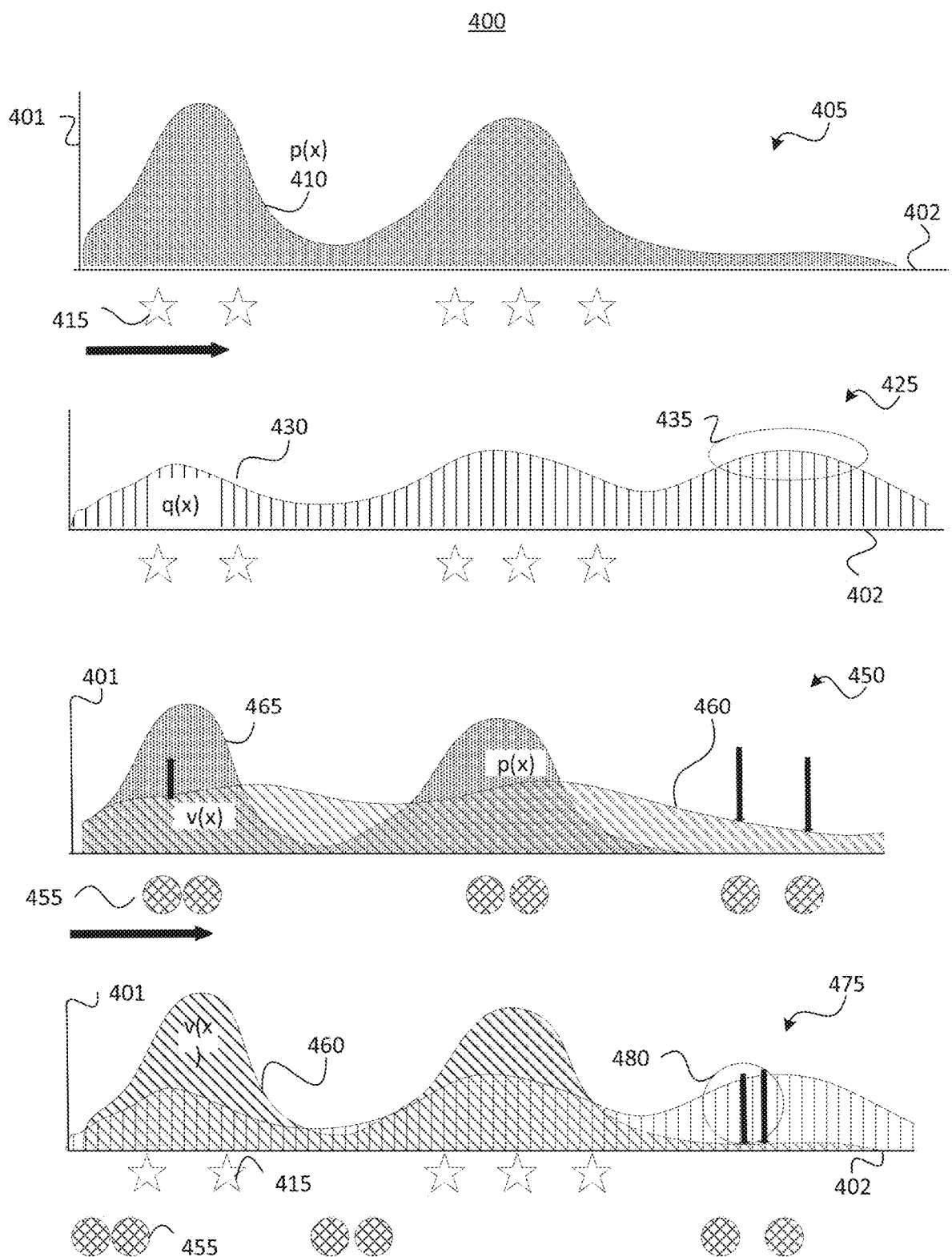
FIG. 4 is a block diagram illustrating a process of training the model, in accordance with the present invention.

Referring now to FIG. 4, a process 400 of training the interpretable model is illustrated.

FIG. 4 illustrates the process of training an interpretable model. The first distribution p(x) 410 is sampled (for example, samples are received, etc.) 405 to determine samples from p 415. As can be seen from FIG. 4, the distributions p(x), q(x) and v(x) are measured based on a probability of events 402 (y-axis) over time 401 (x-axis).

Training 425 the first density estimator, q, 320 (430) alone, ($_q^{min} H(p,q)$) may result in poor samples 415 being generated.

For this reason, a second density estimator, v, 330 (460) is learned jointly (450) ($_v^{min} \tilde{H}_v(p,q)$) with q, 320 which serves to evaluate sample quality (samples from q 455). In this instance, v is posted towards p at samples from q. The latter estimator (v, 330) identifies spurious modes (435) in q. Finally, model q is adjusted again (475), ($_q^{min} H(p,q)) +_v^{min} \tilde{H}_v$ (p,q)) thereby eliminating (480) the bad modes (at which q is penalized for high density when v≠∅).

Network architecture 300 (in comparison to other systems) generalizes (more of the) data while generating (more) precise samples 425 by training the model to minimize the symmetric KL divergence between the data distribution p (for example, p(x) 410) and the model distribution q (for example, q(x) 430). Specifically, according to an embodiment, network architecture 300 assigns q as the solution to the following optimization problem:

$$\min_{q \in Q} KL(p \| q) + KL(q \| p), \quad \text{Equation (1)}$$

where Q is an appropriately selected set of model distributions. Minimizing KL (p∥q), also known as the M-projection, ensures that q (430) covers all the modes of p (410), while minimizing the I-projection prevents q (430) from retaining spurious modes (for example, spurious mode 430) not supported in p. As this divergence is an f-divergence, network architecture 300 can optimize the divergence via applying f-gan: training generative neural samplers using variational divergence minimization, which produces q (430) in the form of a function transforming samples from a simple base distribution to samples from q.

This approach, despite having the advantage of not requiring the evaluation of q (430) at any point, shares the disadvantages of other methods that use GANs. These problems can arise because the optimal discriminator is a function of the likelihood ratio p=q: (and) the discriminator is burdened with the duty of representing both p (410) and q (430) in some form. This quantity (for example, the optimal discriminator) can change dramatically during the training process, and provides the only training signal for q, and there is no clear regularization principle for limiting the complexity of this quantity besides imposing generic smoothness constraints.

According to an example embodiment, the network architecture 300 can learn generative models of high-dimensional, continuous data by relaxing the assumption that the training method not rely on direct evaluation of the density of q, since a model with an analytic density can be relatively easily obtained. Simple mixture models can be used for the base distribution (520). In addition, flexible neural density estimators, such as real-valued non-volume preserving (RealNVP), satisfy the requirement that the training method not rely on direct evaluation of the density of q. With this assumption, KL (p∥q) can be optimized via stochastic gradient descent (SGD), since q can be directly evaluated. The network architecture 300 optimizes KL (q∥p) via Fenchel-duality-based variational inference, in similar fashion to applying f-gan: training generative neural samplers using variational divergence minimization. This results in the following approximated version of $$\min_{\theta} -\mathbb{E}_p[\log q_\theta(x))] - H(q_\theta) - \quad \text{Equation (2)}$$
$$\min_{\phi} \{\mathbb{E}_p[e^{\log q_\theta(x) - V_\phi(x)}] + \mathbb{E}_q, V_\phi(x)\}.$$

Here, Vφ is a scalar-valued function of the state that is interpreted as a Gibbs energy. Although Vφ is analogous to the GAN discriminator, the optimal Vφ (as described herein below) is p (410) rather than some function of p=q. This provides a regularization principle: Vφ is to be structured to assign similar energies to similar examples and incorporate any available prior samples for p (for example, 415). For example, if x is an image, then a translationally-invariant $V\varphi$ (such as a CNN) may be appropriate (for example, v(x) 460). Energy-based methods for structured prediction can be applied. Since the optimal value of the inner optimization is independent of q, this method also confers benefits to training stability. Any available prior knowledge for p characterizes the structure of $V\varphi$ and if the network architecture 300 has information regarding which data distribution (p) the network architecture 300 is modeling, the network architecture 300 can incorporate such knowledge to design $V\varphi$ accordingly. For example, if x is an image, the network architecture 300 can parameterize $V\varphi$ using convolutional neural network (CNN).

Network architecture 300 determines the symmetric sum of KL-divergences between the target distribution p and the learned distribution q:

$$J(p,q)=KL(p\|q)=H(p,q)-H(p)+H(q,p)-H(q) \quad \text{Equation (3)}.$$

More particularly, network architecture 300 seeks to optimize q to minimize Eq. 3, which is independent of the entropy of the target distribution (H(p) is an entropy of p).

$$\min_q J(p, q) = \min_q H(p, q) - H(q) + H(q, p). \quad \text{Equation (4)}$$

The first term, H(p,q), is the "forward cross-entropy," and corresponds to a standard likelihood maximization of data sampled from p under the log-density of q. The forward cross-entropy can be optimized (in a straight forward manner) by leveraging the exact inference property of the pushforward distribution (or normalizing flow). The middle term, H(q), is simply the entropy of q. The last term, the "reverse cross-entropy," cannot be computed without knowledge of the density p. H(q,p) can be expanded as shown below:

$$H(q,p)=-\mathbb{E}_{r\sim q}\log p(x)=\int_X q(x)(-\log p(x))dx \quad \text{Equation (5)}$$

In example embodiments, network architecture 300 can apply lower bounds to Eq. 5 to thereby remove requirement evaluation of log p(x). Consider the Fenchel conjugate of f(p)=-log(p): f*(λ)=-1-log(-λ); λ<0. A Fenchel conjugate is a convex and lower semi continuous function, defined on the dual space. By the definition of Fenchel conjugacy, network architecture 300 can lower-bound the cross-entropy of Eq. 5:

$$f(p) \geq \sup_{\lambda<0}\{\lambda p - f^*(\lambda)\} = \sup_{\lambda<0}\{\lambda p + 1 + \log(-\lambda)\}. \quad \text{Equation (6)}$$

$$H(q, p) \geq \int_X q(x)\left(\sup_{\lambda(x)<0} \lambda(x)p(x) + 1 + \log(-\lambda(x))\right)dx. \quad \text{Equation (7)}$$

$$\geq \sup_{\lambda(x)<0} \int_X q(x)(\lambda(x)p(x) + 1 + \log(-\lambda(x)))dx. \quad \text{Equation (8)}$$

$$\geq 1 + \sup_{\lambda(x)<0} \int_X q(x)(\lambda(x)p(x) + \log(-\lambda(x)))dx. \quad \text{Equation (9)}$$

$$= 1 + \sup_{\lambda(x)<0} \{\mathbb{E}_p[\lambda(x)q(x)] + \mathbb{E}_q\log(-\lambda(x))\}. \quad \text{Equation (10)}$$

The minimization problem in Eq. 4 becomes an adversarial optimization:

$$\min_q J(\mu, q) \geq \min_q(-\mathbb{E}_p[\log q(x)]) - \quad \text{Equation (11)}$$

$$H(q) + \sup_{\lambda(x)<0}\{\mathbb{E}_p[\lambda(x)q(x)] + \mathbb{E}_q\log(-\lambda(x))\}).$$

Let λ(x)=-1=v(x); v(x)>0. Then, $$\min_q J(p, q) \geq \min_q(-\mathbb{E}_p[\log q(x)]) - \quad \text{Equation (12)}$$

$$H(q) + \sup_{v(x)>0}\left\{-\mathbb{E}_p\left[\frac{q(x)}{v(x)}\right] - \mathbb{E}_q\log(v(x))\right\}).$$

$$= \min_q(-\mathbb{E}_p[\log q(x)]) - \quad \text{Equation (13)}$$

$$H(q) - \inf_{v(x)>0}\left\{\mathbb{E}_p\left[\frac{q(x)}{v(x)}\right] + \mathbb{E}_q\log(v(x))\right\}).$$

$$= \min_q(-\mathbb{E}_p[\log q(x)]) - H(q) - \quad \text{Equation (14)}$$

$$\inf_{v(x)>0}\{\mathbb{E}_p[e^{\log q(x)-\log v(x)}] + \mathbb{E}_q\log(v(x))\}).$$

Figure 5:
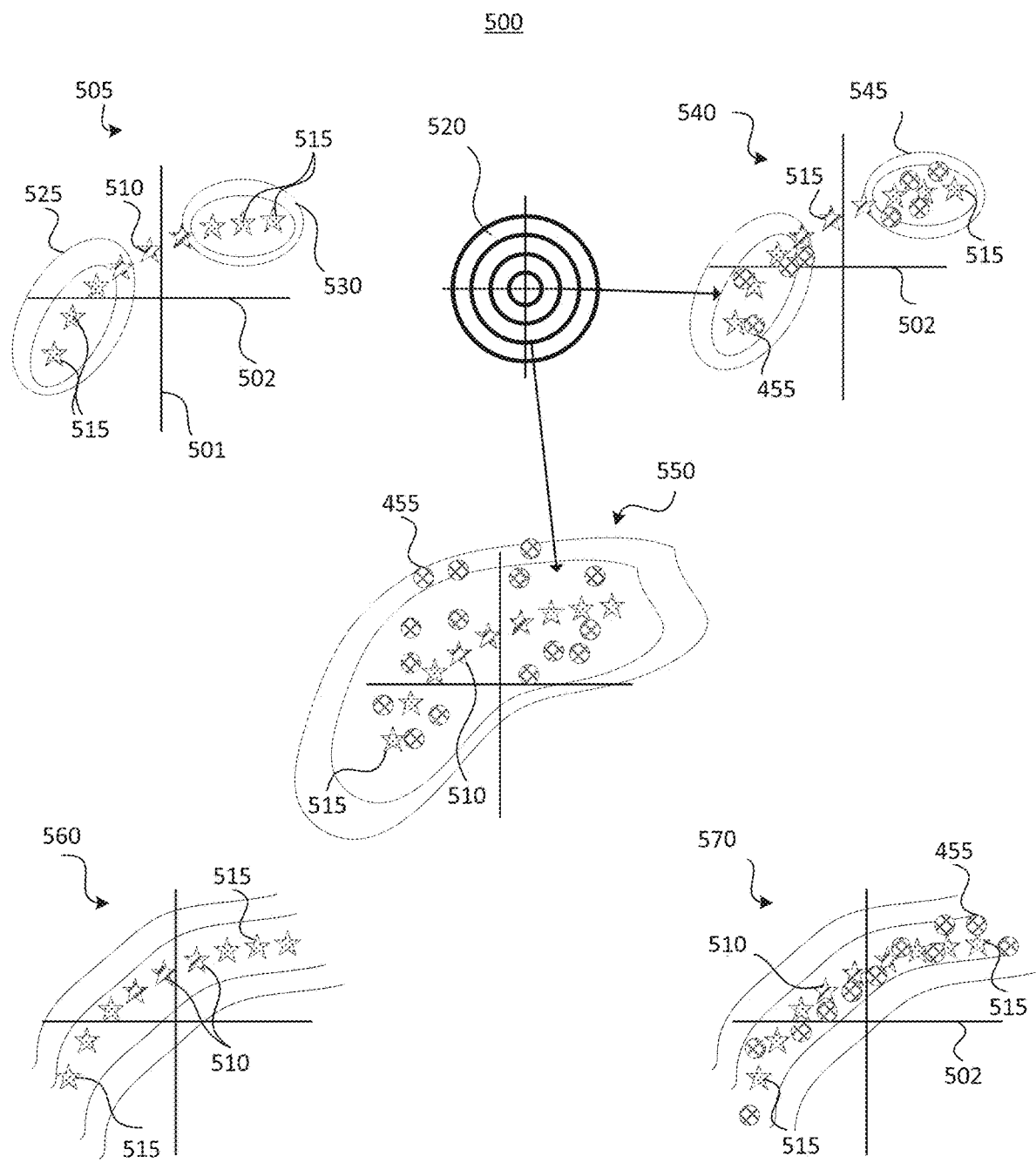
FIG. 5 is a block diagram illustrating mitigation of overfitting, in accordance with the present invention.

Network architecture 300 imposes a specific form on v to interpret it as an unnormalized Gibbs energy. Network architecture 300 uses v(x)=exp(V$\varphi$(x)), where V$\varphi$(x): $\square^d \rightarrow \square$ is a learned function (e.g., a neural-network) that "scores" samples, such as shown in FIG. 5. Finally, network architecture 300 formulates the optimization problem in terms of this parameterized energy function V$\varphi$ and parameterized q$\theta$:

$$\min_\theta -\mathbb{E}_p[\log q_\theta(x)] - H(q_\theta) - \quad \text{Equation (15)}$$

$$\min_\phi\{\mathbb{E}_p[e^{\log q_\theta(x)-V_\phi(x)}] + \mathbb{E}_{q_\theta} V_\phi(x)\}.$$

FIG. 5 illustrates a system for mitigation of overfitting of samples 500 that can be implemented by network architecture 300.

Network architecture 300 structures the model v to conform to the symmetries present in the data. Network architecture 300 thereby allows bad modes to be identified and pruned from q without pruning good modes.

As shown in FIG. 5, samples can include unobserved data 510, observed data 515 and generated samples 455. The samples are observed (in a two-dimensional (2D) configuration) around a first axis 501 and a second axis 502.

The base distribution generator 520 generates samples 455 of unobserved data. As shown with regard to distribution 505, high v regions 530 can be formed in which v overfits if not regularized (for example, in instances of high-quality samples for a small subset of the data). Base distribution is a latent distribution (Gaussian or Gaussian mixture) where the data lies in an high dimensional space. The density of data points is estimated in this latent space following the base distribution by mapping data points through q. As shown with regard to distribution 540, high-q regions 545 can be formed in which v overfits if under-regularized (for example, in instances of less precise samples). Minimization of penalty from v refers to the second min of Equation (2). Minimization of penalty from v assigns similar energy with q for samples from p (540). Moreover, the structured V allows preventing overfitting to q and modeling unobserved data as well (570).

As shown in 550, $_q^{min}$H(p,q) tends to overestimate support of p. In this instance, there are a larger number of generated samples 455 than appropriate, indicating a higher probability of events than realistic. This is a manifestation of the spurious mode. The example embodiments suppress the spurious mode.

A Gibbs structured v (for example, as shown in 560) mitigates overfitting by correlating energies of similar points. In 570, the Gibbs structured v prevents penalization of samples similar to training data under Gibbs energy. In this instance there is a minimization of penalty from v and the v is properly regularized in a manner that prevents q overfitting.

Figure 6:
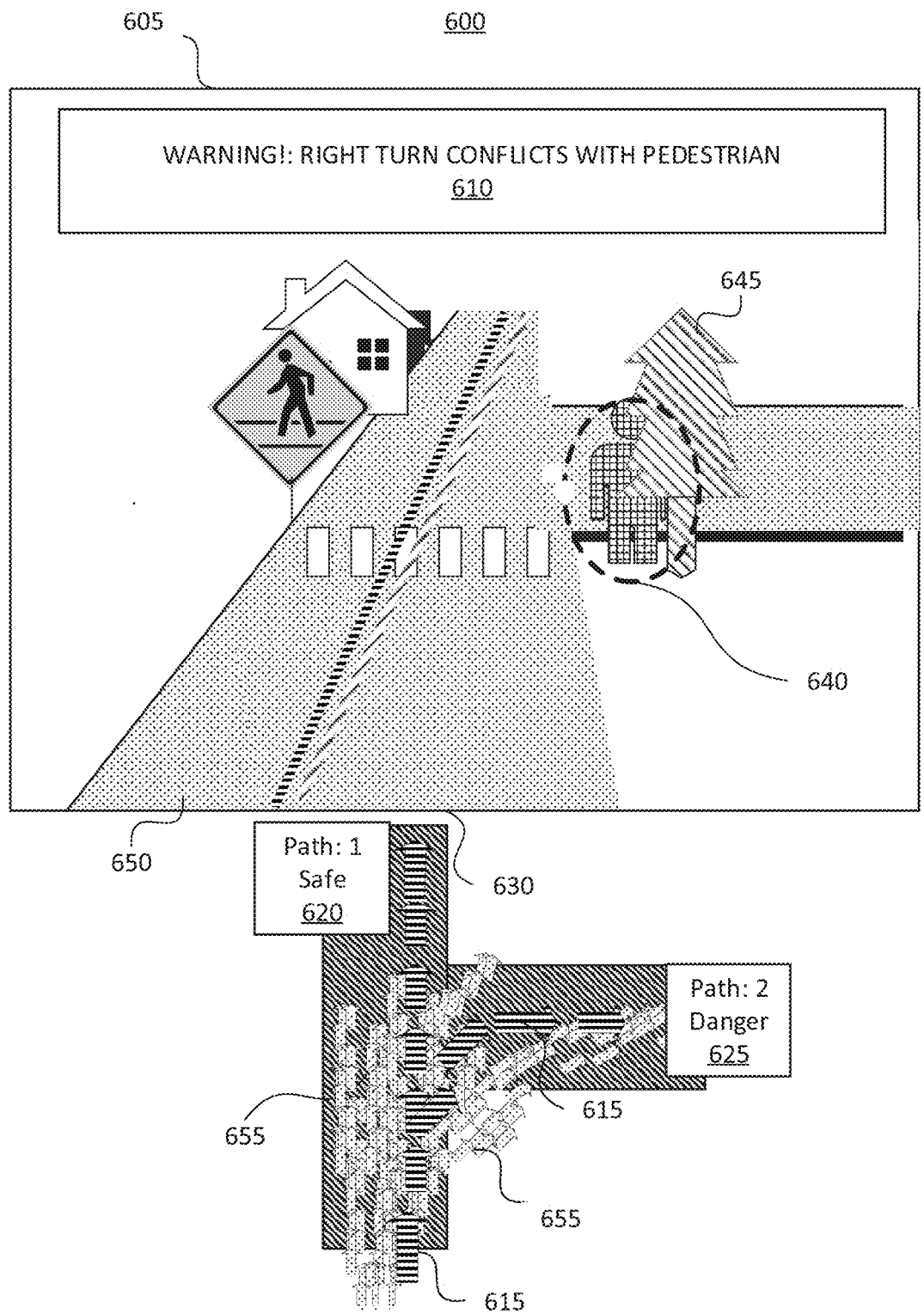
FIG. 6 is a block diagram illustrating a potential warning generated by the system in a hazardous situation, in accordance with the present invention.

FIG. 6 illustrates a potential warning generated by a system in a vehicle using the network architecture 300 in a hazardous scenario (for example, situation) 600.

As shown in FIG. 6, a motor vehicle (for example, a car, truck, etc.) windscreen 605 with a messaging section 610 is illustrated. The messaging section can receive and display messages from an associated system in the vehicle.

The system detects that the vehicle may either turn right (625) or continue through the intersection (path: 1 safe 620). If the vehicle turns right 630, (path: 2 danger 625) the vehicle may collide with a pedestrian (640) crossing the street (650) (partially obscured by tree 645). A warning is therefore issued to alert the driver of this potentiality (displayed in the messaging section 610, Warning! Right turn conflicts with pedestrian). In the lower portion of FIG. 6, larger arrows 615 (with striped stippling) show the two potential modes of future behavior detected by the system. Smaller arrows (in background of arrows 615) show samples 655 drawn from the predicted future trajectory distribution.

According to example embodiments, the system mitigates failure modes by learning a probabilistic model of vehicle motion that assigns high probability to most of the plausible paths in the scene while ensuring that every prediction generated by the model is also likely under the true distribution of future paths. The system then generates samples from this model to estimate the probability that the future path of the vehicle will collide with an obstacle. The predicted future trajectory distribution can be determined to a greater accuracy based on analyzing the distribution in a similar manner as described with respect to first distribution p(x) 410 to ensure unobserved modes are properly accounted for.

The system provides a warning 610 a driver of a potential collision with sufficient notice to allow the driver to make a corrective action. The system determines a proper estimate of the probability of collision. The system mitigates failure modes (for example, underestimation or overestimation of the probability of collision) by learning a probabilistic model of vehicle motion that assigns high probability to most of the plausible paths in the scene while ensuring that every prediction generated by the model is also likely under the true distribution of future paths. The system then generates samples from this model to estimate the probability that the future path of the vehicle will collide with an obstacle.

Figure 7:
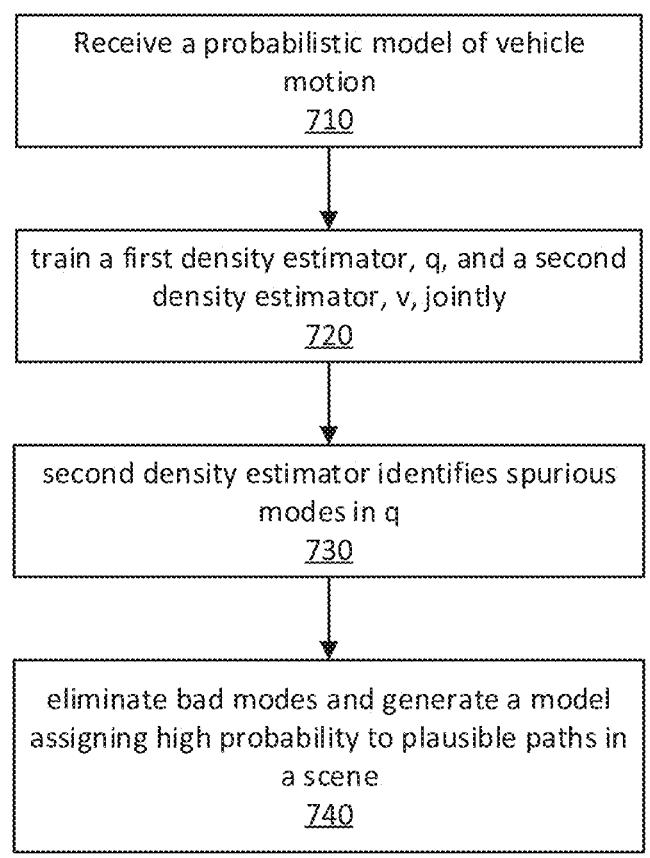
FIG. 7 is a flow diagram illustrating a method for training and evaluating a deep generative model with an architecture consisting of two complementary density estimators, in accordance with the present invention.

Referring now to FIG. 7, a method 700 for training and evaluating a deep generative model with an architecture consisting of two complementary density estimators is illustratively depicted in accordance with an embodiment of the present invention.

At block 710, network architecture 300 receives a probabilistic model of vehicle motion.

At block 720, network architecture 300 trains a first density estimator, q, and a second density estimator, v, jointly. The first density estimator and the second density estimator access the probabilistic model of vehicle motion. The first density estimator determines a distribution of outcomes (for example, a probability of collision). The network architecture 300 also evaluates sample quality based on the second density estimator.

At block 730, the second density estimator identifies spurious modes in q.

At block 740, network architecture 300 adjusts the model q, eliminating the substantially implausible (for example, bad, incorrect) modes and generating a model (of the vehicle motion) that assigns high probability to plausible paths in a scene while ensuring that every prediction generated by the model is also likely under the true distribution of future paths.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for training and evaluating a deep generative model with an architecture consisting of two complementary density estimators, comprising:
   receiving a probabilistic model of vehicle motion;
   training, by a processing device, a first density estimator and a second density estimator jointly based on the probabilistic model of vehicle motion, wherein the first density estimator determines a distribution of outcomes and the second density estimator estimates sample quality;
   identifying by the second density estimator spurious modes in the probabilistic model of vehicle motion; and
   adjusting the probabilistic model of vehicle motion to eliminate the spurious modes.

2. The method as recited in claim 1, wherein adjusting the probabilistic model of vehicle motion further comprises:
   generating an adjusted model that assigns high probability to plausible paths in a scene while ensuring that every prediction generated by the adjusted model is also likely under a true distribution of future paths.

3. The method as recited in claim 1, wherein the probabilistic model of vehicle motion includes continuous, high-dimensional, structured data based on paths of intelligent agents.

4. The method as recited in claim 1, further comprising:
   outputting a message to display a warning on an associated display based on the probabilistic model of vehicle motion.

5. The method as recited in claim 1, further comprising:
   training the probabilistic model of vehicle motion to balance dual objectives of generating diverse samples while ensuring high quality samples.

6. The method as recited in claim 1, further comprising:
   determining potential modes of future behavior; and
   determining the distribution of outcomes based on the potential modes of future behavior.

7. The method as recited in claim 1, wherein training the first density estimator and the second density estimator further comprises:
training a network to obtain improved training efficiency, stability, and a balance of diversity and precision in generated examples, while producing an interpretable model.

8. The method as recited in claim 1, wherein the second estimator is trained by optimizing a variational lower bound based on Fenchel duality.

9. The method as recited in claim 1, wherein an optimal value of a model associated with the second estimator is independent of the probabilistic model of vehicle motion.

10. A computer system for training and evaluating a deep generative model with an architecture consisting of two complementary density estimators, comprising:
a processor device operatively coupled to a memory device, the processor device being configured to:
receive a probabilistic model of vehicle motion;
train a first density estimator and a second density estimator jointly based on the probabilistic model of vehicle motion, wherein the first density estimator determines a distribution of outcomes and the second density estimator estimates sample quality;
identify by the second density estimator spurious modes in the probabilistic model of vehicle motion; and
adjust the probabilistic model of vehicle motion to eliminate the spurious modes.

11. The system as recited in claim 10, wherein, when adjusting the probabilistic model of vehicle motion, the processor device is further configured to:
generate an adjusted model that assigns high probability to plausible paths in a scene while ensuring that every prediction generated by the adjusted model is also likely under a true distribution of future paths.

12. The system as recited in claim 10, wherein the probabilistic model of vehicle motion includes continuous, high-dimensional, structured data based on paths of intelligent agents.

13. The system as recited in claim 10, wherein the processor device is further configured to:
output a message to display a warning on an associated display based on the probabilistic model of vehicle motion.

14. The system as recited in claim 10, wherein the processor device is further configured to:
train the probabilistic model of vehicle motion to balance dual objectives of generating diverse samples while ensuring high quality samples.

15. The system as recited in claim 10, wherein the processor device is further configured to:
determine potential modes of future behavior; and
determine the distribution of outcomes based on the potential modes of future behavior.

16. The system as recited in claim 10, wherein, when training the first density estimator and the second density estimator, the processor device is further configured to:
train a network to obtain improved training efficiency, stability, and a balance of diversity and precision in generated examples, while producing an interpretable model.

17. The system as recited in claim 10, wherein the second estimator is trained by optimizing a variational lower bound based on Fenchel duality.

18. The system as recited in claim 10, wherein an optimal value of a model associated with the second estimator is independent of the probabilistic model of vehicle motion.

19. A computer program product for training and evaluating a deep generative model with an architecture consisting of two complementary density estimators, the computer program product comprising a non-transitory computer readable storage medium having program instructions embodied therewith, the program instructions executable by a computing device to cause the computing device to perform the method comprising:
receiving a probabilistic model of vehicle motion;
training, by a processing device, a first density estimator and a second density estimator jointly based on the probabilistic model of vehicle motion, wherein the first density estimator determines a distribution of outcomes and the second density estimator estimates sample quality;
identifying by the second density estimator spurious modes in the probabilistic model of vehicle motion; and
adjusting the probabilistic model of vehicle motion to eliminate the spurious modes.

* * * * *